United States Patent
Gottimukkala et al.

(10) Patent No.: US 8,458,763 B2
(45) Date of Patent: Jun. 4, 2013

(54) METHOD OF AUTOMATING AND PERSONALIZING SYSTEMS TO SATISFY SECURITY REQUIREMENTS IN AN END-TO-END SERVICE LANDSCAPE

(75) Inventors: Sivaram Gottimukkala, Morrisville, NC (US); Lap Huynh, Cary, NC (US); Dinakaran Joseph, Apex, NC (US); Michael Law, Morrisville, NC (US); Linwood Overby, Jr., Raleigh, NC (US); Wesley Devine, Apex, NC (US); Michael Behrendt, Randersacker (DE); Gerd Breiter, Wildberg (DE)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 12/166,236

(22) Filed: Jul. 1, 2008

(65) Prior Publication Data

US 2010/0005504 A1     Jan. 7, 2010

(51) Int. Cl.
*G06F 17/00*     (2006.01)
*H04L 9/00*     (2006.01)

(52) U.S. Cl.
USPC ............... 726/1; 726/2; 726/3; 726/4; 726/5; 726/6; 713/151; 713/152; 713/153; 713/154

(58) Field of Classification Search
USPC .................................................... 726/1
See application file for complete search history.

(56) References Cited

U.S. PATENT DOCUMENTS

2008/0008202 A1*   1/2008   Terrell et al. ................. 370/401

* cited by examiner

*Primary Examiner* — Longbit Chai
(74) *Attorney, Agent, or Firm* — Novak Druce Connolly Bove + Quigg LLP

(57) ABSTRACT

A computer-implemented method of enabling security in network resources provisioned as part of a service landscape instance is provided. The method includes initiating an orchestration process for creating a landscape service instance to provide services to a service subscriber over a data communications network. The method further includes deriving from the orchestration process at least one parameter, and generating at least one security configuration profile based upon the at least one parameter for at least one system of the landscape service instance.

18 Claims, 4 Drawing Sheets the present invention are provided by the methods and systems described herein.
METHOD OF AUTOMATING AND PERSONALIZING SYSTEMS TO SATISFY SECURITY REQUIREMENTS IN AN END-TO-END SERVICE LANDSCAPE

FIELD OF THE INVENTION

The present invention is related to the field of provisioning services in a data communications network environment, and more particularly, to techniques for efficiently enabling security in systems provisioned as part of a service landscape instance.

BACKGROUND OF THE INVENTION

One result of advances in information technology (IT) is the emergence an on-demand, pay-as-you-go utility model for software development and deployment. According to this model, applications and other IT resources are provided to customers by a service provider through a data communications network, especially the Internet. A particular model is the software-as-a-service (SaaS) model of software deployment whereby an application is hosted as a service that is provided to customers over the Internet. Among the advantages of the model is that it obviates the need to install and run the application on a customer's own computer and mitigates customer difficulties pertaining to software maintenance. SaaS also can reduce the customer's up-front costs of software purchases, through less costly, on-demand pricing. For a vendor, SaaS can be a mechanism for protecting the vendor's intellectual property and can generate an on-going revenue stream. A SaaS vendor may host the application on its own web server, or provide the application through a third-party application service provider (ASP).

Under such a utility model, because data is exchanged over a network, security is an important consideration. Network resources thus typically must maintain security policy rules which control actions for traffic between the network resources. These rules typically establish conditions that include a local Internet Protocol (IP) address and port as well as a remote IP address and port. Examples of such security policy rules are those used for IP packet filtering, by the IPsec (IP security) suite of protocols for securing IP communications by authenticating and/or encrypting each IP packet in a data stream, and by the IBM z/OS Application Transparent Transport Layer Security (AT-TLS).

As new network resources are provisioned and added to a service landscape instance, policy rules in the newly-provisioned network resource must be created so as to permit communication between the newly-provisioned network resource and eligible, remotely-located network resources. Additionally, when a network resource is provisioned, other resources in the service landscape instance must be updated to allow communication between the newly-provisioned network resource and pre-existing network resources. Enabling security for an IT infrastructure, such as configuring system firewalls and intrusion defenses, however, typically involves considerable manual configuration effort and generally requires platform-specific expertise. The process, if performed manually, can be time-consuming, error-prone, and potentially disruptive. Enabling security to protect networked systems that form the service landscape instance, however, is likely to be a key factor in the acceptance and deployment of new on-demand services.

SUMMARY OF THE INVENTION

In view of the foregoing background, it is therefore a feature of the invention to provide effective and efficient mechanisms for efficiently enabling security in systems provisioned as part of a service landscape instance. This and other features and advantages in accordance with the present invention are provided by the methods and systems described herein.

One embodiment of the invention is a computer-implemented method for enabling security in systems provisioned as part of a service landscape instance. The method can include initiating or responding to an orchestration process for creating a landscape service instance to provide services to a service subscriber over a data communications network. The method can also include deriving information and/or at least one parameter from the orchestration process. The method can further include generating a security configuration profile based upon the information and/or at least one parameter for a system of the landscape service instance.

Another embodiment of the invention is a system for enabling security in network resources provisioned as part of a service landscape instance. The system can include one or more processors for executing processor-executable code, and a security-configuring module configured to execute on the one or more processors for generating a security configuration profile. The security-configuring module can be configured to respond to an orchestration process, by which a landscape service instance is created to provide services to a service subscriber over a data communications network, by deriving from the orchestration process at least one parameter. The security-configuring module can be further configured to generate a security configuration profile for at least one system of the landscape service instance, the security configuration profile being based upon the at least one parameter derived from the orchestration.

Still another embodiment of the invention is a computer-readable medium in which computer-readable code is embedded and which when loaded on and executed by a computer system causes the computer system to perform the following steps: initiating or responding to an orchestration process for creating a landscape service instance that is created to provide services to a service subscriber over a data communications network; deriving from the orchestration process at least one parameter; and generating a security configuration profile based upon the at least one parameter for a system of the landscape service instance.

BRIEF DESCRIPTION OF THE DRAWINGS

There are shown in the drawings, embodiments which are presently preferred. It is expressly noted, however, that the invention is not limited to the precise arrangements and instrumentalities shown in the drawings.

DETAILED DESCRIPTION

The invention is directed to methods and systems for enabling security in systems provisioned as part of a service landscape instance. The following terms, as defined, are used herein to describe various embodiments of the invention:

Software-as-a-Service (SaaS). SaaS denotes a software distribution service model wherein a software application is hosted by a service provider, and service subscribers can access the service over a private computer communications network or a public computer communications network such as the Internet;

Platform-as-a-Service (PaaS). PaaS denotes, generally, any area or portion of an SaaS focused on hosting software that provides a development/test platform, such as an integrated development environment (IDE) software application that provides comprehensive facilities which can be used by a computer programmer for software development;

Service Landscape. A service landscape is a SaaS architecture model for delivering a service, an example of which is a multi-tier web service (e.g., a three-tier architecture comprising a web server, application server, and database server) delivery model;

Service Landscape Instance. A service landscape instance is a realization or instantiation of a service landscape in which various IT resources (e.g., servers, network, and storage) are provisioned and managed according to a service subscription Service Level Agreement (SLA);

Virtual Machine/Software Image. Virtual Machine/Software Image denotes a pre-built software stack, which can include an operating system, middleware, and applications, to provide a service once installed in a network-connected system and activated.

Figure 1:
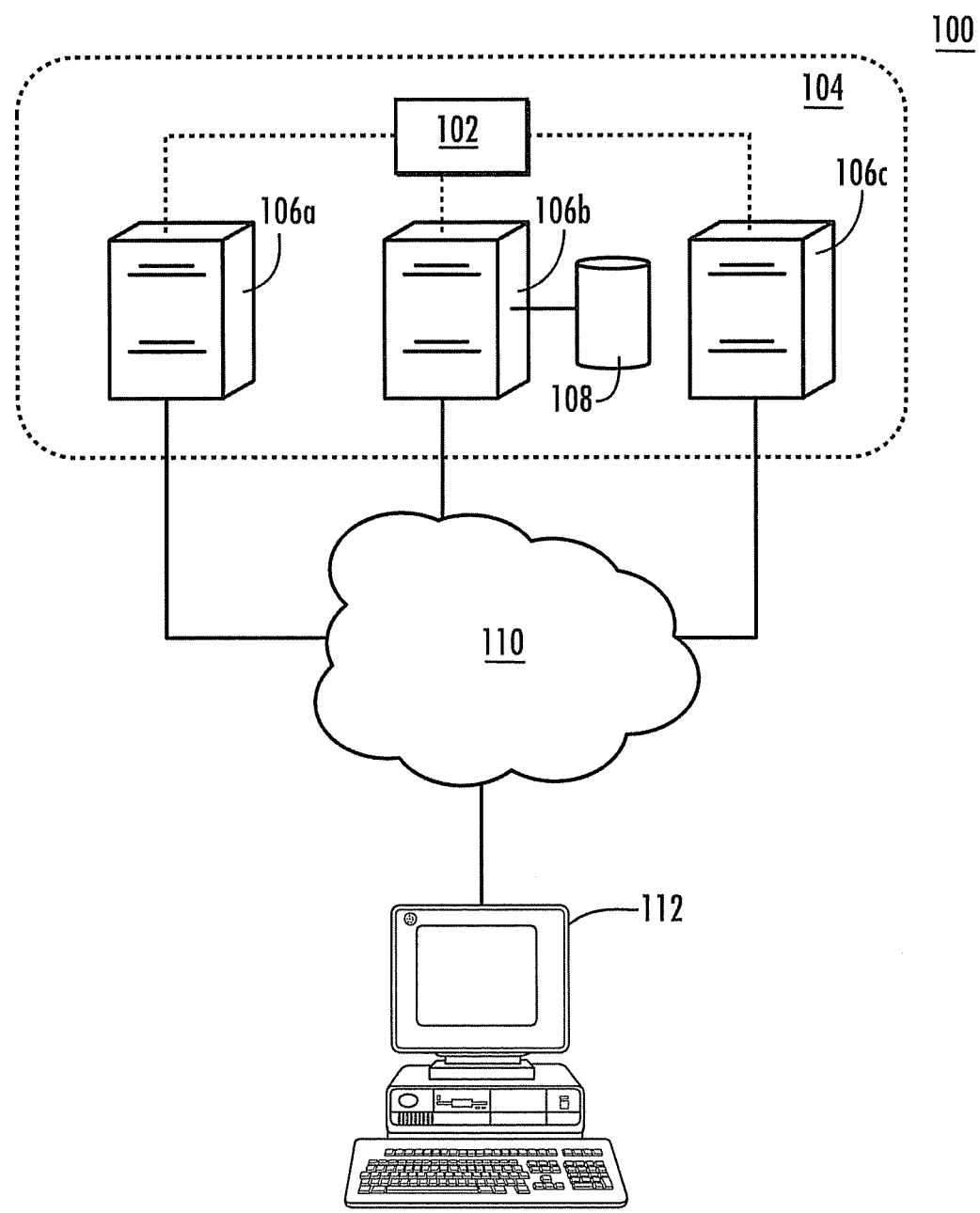
FIG. 1 is a schematic view of a network environment in which a system for enabling security in systems provisioned as part of a service landscape instance, according to one embodiment of the invention, can be advantageously utilized.

Referring initially to FIG. 1, a schematic view is provided of an exemplary network environment 100 in which a system 102 for enabling security in systems provisioned as part of a service landscape instance, according to one embodiment, can be advantageously utilized. The network environment 100 includes a service landscape instance 104 in which the system 102 is deployed. Consistent with the definition set forth above, the service landscape instance 104 illustratively includes three computing devices 106a-c and at least one database 108 communicatively linked to one of the computing devices 106b. Illustratively, the computing devices 106a-c are communicatively linked through a data communications network 110, such as the Internet. As shown, one or more other computing devices 112 can communicatively link to the one or more of the computing devices 106a-c through the data communications network 110 for accessing systems and other network resources of the service landscape instance 104. By accessing the systems and/or other network resources, a service subscriber can obtain via the data communications network services, such as an SaaS or a PaaS application.

Although the service landscape instance 104 illustratively includes three computing devices 106a-c, it will be readily apparent from the description set forth herein that more or fewer computing devices can be included in the service landscape instance 104. Moreover, though not explicitly shown, the service landscape instance 104 can further include various applications (e.g., an SaaS and/or PaaS) or other network resources residing on one or more of the computing devices 106a-c.

Preferably, the computing devices 106a-c are servers for hosting applications and other network resources that can be accessed by a remote device or system over the data communications network 110. In alternate embodiments, however, one or more of the computing devices 106a-c can comprise various other types of general-purpose or application-specific computing devices. It is also noted that though the communications links between the various elements of the network environment 100 are shown as wired connections that traverse the data communications network 110, which can include various intermediate nodes not explicitly shown. In other embodiments, however, the communications links can alternatively or additionally comprise wireless communication links. More generally, the communications link can comprise any physical or virtual (e.g., Virtual Private Network) connection.

Figure 2:
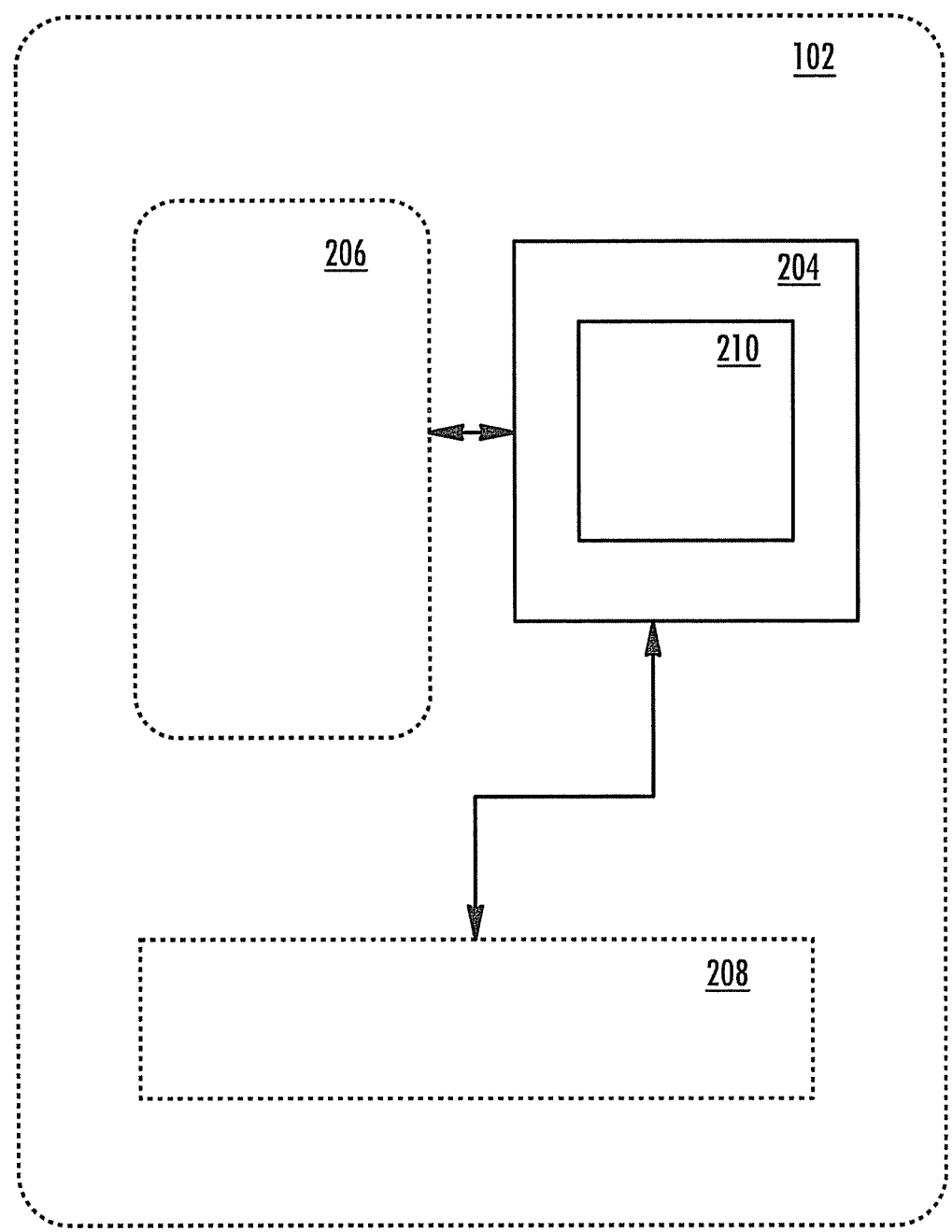
FIG. 2 is a schematic view of the system for enabling security in systems provisioned as part of a service landscape instance shown in FIG. 1.
Figure 3:
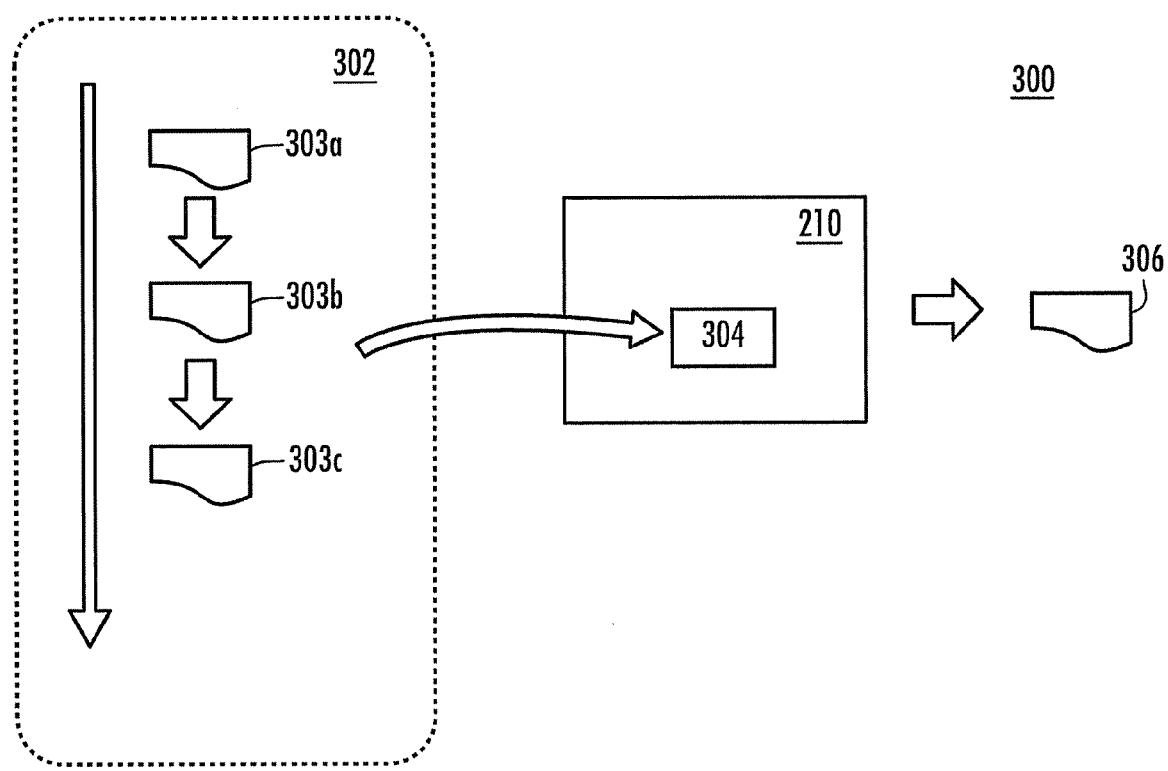
FIG. 3 is a schematic view of certain operative features of the system illustrated in FIG. 2.

Referring additionally to FIG. 2, a more detailed schematic view of the system 102 is provided. The system 102 illustratively includes one or more processors 204. Though not explicitly shown, the one or more processors 204 can each comprise a plurality of registers, an arithmetic-logic unit, and a control unit. Thus, the system 102 can be configured to process processor-executable instructions in a single-thread, single-processor environment, in a single-thread, multi-processor environment, or in a multi-thread, multi-processor environment. Moreover, the one or more processors 204 can exist on a single computing device or on different computing devices. When the system 102 is implemented in multiple computing devices according to a distributed computing architecture, the devices can be co-located at a common site. Alternately the computing devices can be remotely-located from one another and configured to communicate through the data communications network 110. Optionally, the system 102 can further include one or more memory elements 206 for electronically storing processor-executable instructions and data representations. The system 102 also can optionally include one or more network interfaces 208 for communicating with other network-connected systems and devices via the data communications network 110.

The system 102 further illustratively includes a security-configuring module 210 for generating a security configuration profile. The security configuration profile can be used to establish various types of defenses for protecting network resources of the service landscape instance 104 against security breaches, intrusions, attacks, and degradation. Preferably, the security-configuring module 210 is implemented in a combination of logic-based processing circuitry and processor-executable code for carrying out the procedures and functions described herein. Accordingly, the security-configuring module 210 can be configured to execute on the one or more processors 204 of the system 102. Alternatively, however, the security-configuring module 210 can be implemented in dedicated hardwired circuitry configured to cooperatively operate in conjunction, but not under direct control of, the one or more processors 204 for carrying out the same procedures and functions.

The deployment of a landscape solution whereby services are provided to a service subscriber involves a process, or orchestration, to provision an infrastructure to support requested services provided by the service landscape instance 104. The orchestration by which the infrastructure is created can include provisioning system servers, virtual servers, data storage, and networking technologies, as well as other network resources that define the service landscape instance 104. The orchestration of an infrastructure includes creating server configuration profiles to ensure that the specified Service Level Agreement (SLA) under which a service subscriber obtains services is satisfied over the lifecycle of the service landscape instance 104. More particularly, the orchestration translates an overall SLA of the service landscape instance 104 to an SLA for individual resource domains such as system servers, virtual servers, data storage elements, and networking elements, such as Internet Protocol (IP) elements.

In this context, certain operative features 300 of the security-configuring module 210 are schematically shown in FIG.

3. The operations are performed in concert with an orchestration process 302 whereby the server configuration profiles 303a-c are created for the landscape service instance 104 so as to provide services to a service subscriber over the data communications network 110. In response to initiation of the orchestration process 302, the security-configuring module 210 derives from the orchestration process one or more parameters 304. Based on the one or more parameters 304. The security-configuring module 210 generates one or more security configuration profiles 306. Additionally, or alternatively, the security-generating module 210 can derive parameters from software image profiles that are part of the service landscape instance 104.

For example, the parameters so obtained can comprise information derived from the software appliance specification according to DMTF Open Virtualization Framework (OVF) standard for the Virtual Machine/Appliance specification.

The parameters and information so obtained by the security-configuring module 210 can include IP addresses to be configured for systems or servers of the service landscape instance 104 that host services provided over the data communications network 110. The parameters and information can include Transmission Control Protocol (TCP) port numbers. The parameters and information likewise can include transport types, such as those of the User Datagram Protocol (UDP) and Session Initiation Protocol (SIP). The parameters and information used by the security-configuring module 210 can include a set of credentials, such as a userid or password, that is configured to permit access to services hosted in the service landscape instance 104. The credentials can be obtained by the security-configuring module 210 from a virtual appliance or software image specification that is being deployed into a service landscape instance.

Additionally or alternatively, parameters and information derived for generating the security configuration profile by the security-configuring module 210 can include information or parameters obtained from one or more templates selected by a set of security policy configuration templates during the orchestration process 302. The templates can specify a security level (e.g., HIGH, MEDIUM, or LOW) in accordance with the SLA corresponding to the service landscape instance 104. A template selection process can be derived based on a policy which dictates various deployment conditions for selecting one of the set of templates. The templates in combination with other information pertaining to the service landscape instance 104, generally, and virtual images and/or appliances, specifically, can be used to generate a system security configuration. In one embodiment, the configuration can be generated with the assistance of the z/OS Configuration Assistant (CA)®, which is configured to generate a RequirementMap that describes the type of network traffic, such as DB2, CICS, as well as a Security Service level associated with the traffic. The z/OS CA also specifies a Connectivity template that describes the IP/TCP connection end point (i.e., IP addresses).

As already noted, the security configuration profile 306 generated by the security-configuring module 210 can be used to establish various types of defenses for protecting network resources of the service landscape instance 104 against security breaches, intrusions, attacks, and degradation. The security configuration profile 306 can be used to construct a firewall for a particular system in the service landscape instance 104. The security configuration profile 306 can be used to activate an Intrusion Defense System to detect and deny unauthorized accesses to the particular system. More particularly, the security configuration profile 306 specify actions by which attacks on the system are correlated and elicit a rapid response in an end-to-end landscape instance. The security configuration profile 306 can specify encryption for traffic between systems in the service landscape instance 104. The encryption can use IP security or that provided, for example, by the z/OS Application Transparent—Transport Layer Security (AT-TLS). Additionally, or alternatively, the security configuration profile 306 can specify a security configuration to protect access to one or more systems in the service landscape instance 104 through authentication-and-authorization security processes, such as by specifying credentials necessary to log into and use system services provided by the service landscape instance 104.

Figure 4:
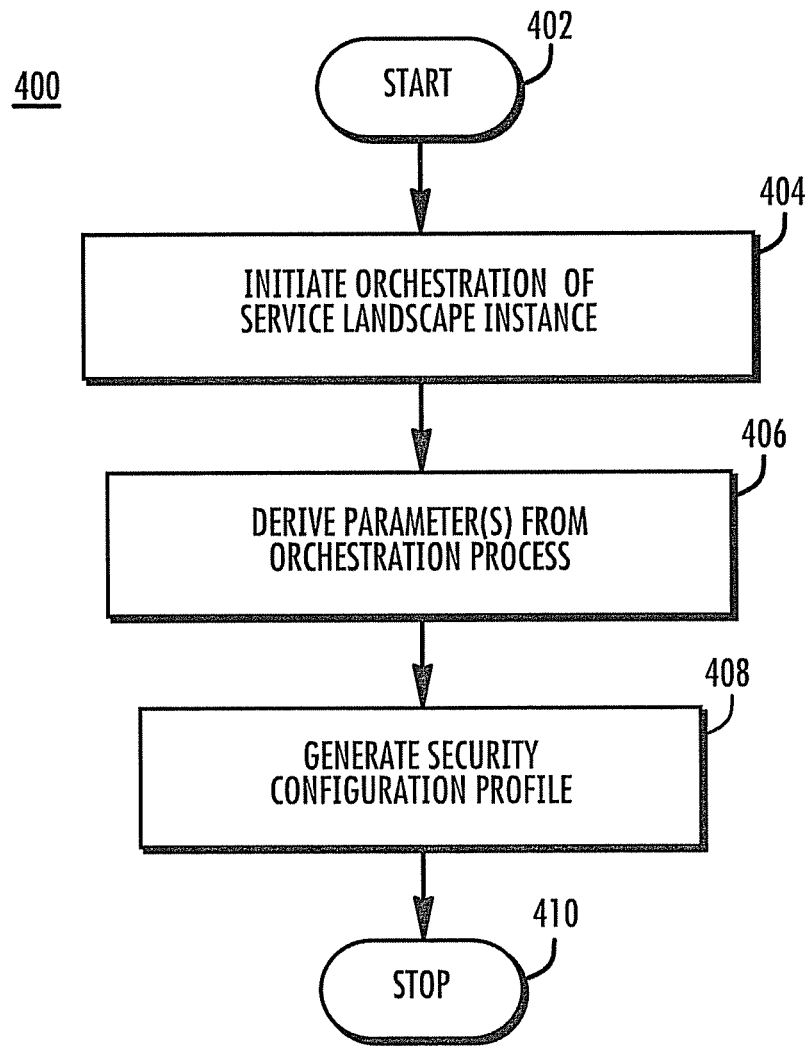
FIG. 4 is a flowchart of exemplary steps in a method of for enabling security in systems provisioned as part of a service landscape instance, according to another embodiment of the invention.

Certain method aspects are illustrated by the flowchart of FIG. 4. FIG. 4 is a flowchart of exemplary steps in a method 400 of for enabling security in systems provisioned as part of a service landscape instance, according to another embodiment of the invention. The method 400, after the start at block 402, illustratively includes initiating or responding to an orchestration process for creating a landscape service instance to provide services to a service subscriber over a data communications network at block 404. The method 400 also illustratively includes deriving from the orchestration process one or more parameters at block 406. The method 400 further illustratively includes, at block 408, generating a configuration profile for at least one system of the landscape service instance based upon the one or more parameters derived in the previous step. The method 400 illustratively concludes at step 410.

According to one embodiment, the step of deriving at least one parameter at block 406 comprises deriving at least one parameter from a software image profile of an application provisioned by the landscape service instance. Additionally, or alternatively, the step at block 406 can comprise obtaining an Internet Protocol (IP) address of the at least one system of the landscape service instance. According to another embodiment of the method 400, the step of deriving at least one parameter at block 406 can comprise obtaining at least one among a Transmission control Protocol (TCP port number, a User Datagram Protocol (UDP) transport type specification, a Session Initiation Protocol (SIP) transport type specification, Internet Protocol (IP) IDs, corresponding IP addresses, layer 2 MAC addresses, and/or Virtual LAN IDs.

According to yet another embodiment, the step of deriving at least one parameter at block 406 can comprise obtaining a parameter specified in a virtual appliance specification. The virtual appliance specification from which parameters can be obtained include, for example, a software appliance specification according to the DMTF Open Virtualization Framework (OVF) standard. Alternatively, or additionally, the step at block 406 can comprise obtaining a set of credentials configured for accessing a service provisioned by the landscape service instance. According to still another embodiment, the step of deriving at least one parameter at block 406 can comprise determining a security level based upon a security policy configuration template selected based on a Service Level Agreement for obtaining services from the service landscape instance. In a particular embodiment, the step of deriving at least one parameter at step 406 can comprise deriving information from an Activation Engine configuration framework generated with an IBM Solution Assembly Toolkit®.

In one embodiment of the method 400, the step of generating at least one configuration profile at step 408 can comprise generating a configuration profile for performing at least one of the following for protecting a system: establishing a firewall for network resources of the service landscape instance; activating an Intrusion Defense Service (IDS); specifying an encryption type for communications over the data communications network between network resources of the service landscape instance and a service subscriber system; and specifying an authentication-and-authorization process.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product, such as magnetic tape or optically-readable disk having computer-readable code defining a computer program embedded therein, which when loaded to and executed by a computer implements the methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A computer-implemented method for enabling security in systems provisioned as part of a service landscape instance, the method comprising performing, via a processor, the steps of:
    initiating an orchestration process for creating a landscape service instance to provide services to a service subscriber over a data communications network, the orchestration process including provisioning network resources to support the services and creating configuration profiles for the network resources specifying deployment conditions based on a Service Level Agreement (SLA) associated with the service subscriber;
    deriving from the orchestration process at least one parameter; and
    generating a security configuration profile based upon the at least one parameter for a system of the landscape service instance,
    wherein the at least one parameter comprises one or more security parameters obtained from one of a plurality of security policy configuration templates associated with the SLA, and wherein the one of the plurality of security policy configuration templates is selected based on the deployment conditions.

2. The method of claim 1, wherein the step of deriving at least one parameter comprises deriving at least one parameter from a software image profile of an application provisioned by the landscape service instance.

3. The method of claim 1, wherein the step of deriving at least one parameter comprises obtaining an Internet Protocol (IP) address of the at least one system of the landscape service instance.

4. The method of claim 1, wherein the step of deriving at least one parameter comprises obtaining at least one parameter that identifies at least one among a Transmission Control Protocol (TCP port number, a User Datagram Protocol (UDP) transport type specification, a Session Initiation Protocol (SIP) transport type specification, Internet Protocol (IP) IDs, corresponding IP addresses, layer 2 MAC addresses, and/or Virtual LAN IDs.

5. The method of claim 4, wherein the step of deriving at least one parameter comprises obtaining a parameter specified in a virtual appliance specification.

6. The method of claim 1, wherein the step of deriving at least one parameter comprises obtaining a set of credentials configured for accessing a service provisioned by the landscape service instance.

7. The method of claim 1, wherein the step of generating at least one configuration profile comprises generating a configuration profile for performing at least one among establishing a firewall for network resources of the service landscape instance, activating an Intrusion Defense Service (IDS), specifying an encryption type for communications over the data communications network between network resources of the service landscape instance and a service subscriber system, and specifying an authentication-and-authorization process.

8. The method of claim 1, wherein the step of deriving at least one parameter comprises deriving information from a virtual appliance specification.

9. A system for enabling security in network resources provisioned as part of a service landscape instance, the system comprising:
    one or more processors for executing processor-executable code; and
    a security-configuring module configured to execute on the one or more processors for generating a security configuration profile by
        in response to initiation of an orchestration process for creating a landscape service instance to provide services to a service subscriber over a data communications network, deriving from the orchestration process at least one parameter, the orchestration process including provisioning network resources to support the services and creating configuration profiles for the network resources specifying deployment conditions based on a Service Level Agreement (SLA) associated with the service subscriber, and
        generating at least one security configuration profile based upon the at least one parameter for a system of the landscape service instance,
        wherein the at least one parameter comprises one or more security parameters obtained from one of a plurality of security policy configuration templates associated with the SLA, and wherein the one of the plurality of security policy configuration templates is selected based on the deployment conditions.

10. The system of claim 9, wherein the security configuration profile specifies at least one among a firewall configuration for network resources of the service landscape instance, an Intrusion Defense Service (IDS), an encryption type for communications over the data communications network between network resources of the service landscape instance and a service subscriber system, and an authentication-and-authorization process.

11. A non-transitory computer-readable medium in which computer-readable code is embedded and which when loaded on and executed by a computer system causes the computer system to perform the steps of:

initiating an orchestration process for creating a landscape service instance to provide services to a service subscriber over a data communications network, the orchestration process including provisioning resources to support the services and creating configuration profiles for the network resources specifying deployment conditions based on a Service Level Agreement (SLA) associated with the service subscriber;

deriving from the orchestration process at least one parameter; and generating at least one security configuration profile based upon the at least one parameter for a system of the landscape service instance wherein the at least one parameter comprises one or more security parameters obtained from one of a plurality of security policy configuration templates associated with the SLA, and wherein the one of the plurality of security policy configuration templates is selected based on the deployment conditions.

12. The non-transitory computer-readable medium of claim 11, wherein the step of deriving at least one parameter comprises deriving at least one parameter from a software image profile of an application provisioned by the landscape service instance.

13. The non-transitory computer-readable medium of claim 11, wherein the step of deriving at least one parameter comprises obtaining an Internet Protocol (IP) address of the at least one system of the landscape service instance.

14. The non-transitory computer-readable medium of claim 11, wherein the step of deriving at least one security parameter comprises obtaining at least one among a Transmission Control Protocol (TCP port number, a User Datagram Protocol (UDP) transport type specification, a Session Initiation Protocol (SIP) transport type specification, Internet Protocol (IP) IDs, corresponding IP addresses, layer 2 MAC addresses, and/or Virtual LAN IDs.

15. The non-transitory computer-readable medium of claim 11, wherein the step of deriving at least one security parameter comprises obtaining a parameter specified in a virtual appliance specification.

16. The non-transitory computer-readable medium of claim 11, wherein the step of deriving at least one parameter comprises obtaining a set of credentials configured for accessing a service provisioned by the landscape service instance.

17. The non-transitory computer-readable medium of claim 11, wherein the step of generating at least one configuration profile comprises generating a configuration profile for performing at least one among establishing a firewall for network resources of the service landscape instance, activating an Intrusion Defense Service (IDS), specifying an encryption type for communications over the data communications network between network resources of the service landscape instance and a service subscriber system.

18. The non-transitory computer-readable medium of claim 11, wherein the step of deriving at least one parameter comprises deriving information from a virtual appliance specification.

\* \* \* \* \*